United States Patent [19]

Wegener

[11] 4,147,634
[45] Apr. 3, 1979

[54] DEFLECTOR BLADE FOR ROTARY DRUM FILTER

[75] Inventor: Willi A. Wegener, Salt Lake City, Utah

[73] Assignee: Envirotech Corporation, Menlo Park, California

[21] Appl. No.: 886,838

[22] Filed: Mar. 15, 1978

[51] Int. Cl.² ............................................. B01D 33/36
[52] U.S. Cl. .................................................... 210/396
[58] Field of Search .......... 210/79, 332, 372, 391–393, 210/396, 397, 400, 402, 404, 408; 15/256.5

[56] References Cited

U.S. PATENT DOCUMENTS

| 2,669,360 | 2/1954 | Little | 210/396 |
| 3,144,674 | 8/1964 | Broughton | 15/256.6 |
| 3,377,644 | 4/1968 | Budzinski et al. | 15/256.5 |
| 3,460,467 | 8/1969 | Nystrom | 210/402 X |
| 4,038,919 | 8/1977 | Lotte | 15/256.5 X |

Primary Examiner—William A. Cuchlinski, Jr.
Attorney, Agent, or Firm—Robert R. Finch; Robert E. Krebs; Thomas S. MacDonald

[57] ABSTRACT

A segmented cake discharge deflector blade for rotary drum filters. Each segment includes a straight blade mounted on a plurality of spaced apart U-shaped flat steel springs with the free edge of the straight blade extending beyond the closed end of the U. The face of the filter tank is provided with a clamp for receiving the free end of the other leg of each spring. The springs are preselected for proper tension. Complemental elements on the tank wall and springs cooperative with each other provide proper positioning of the free edge of the blade segments relative to the drum face.

2 Claims, 4 Drawing Figures

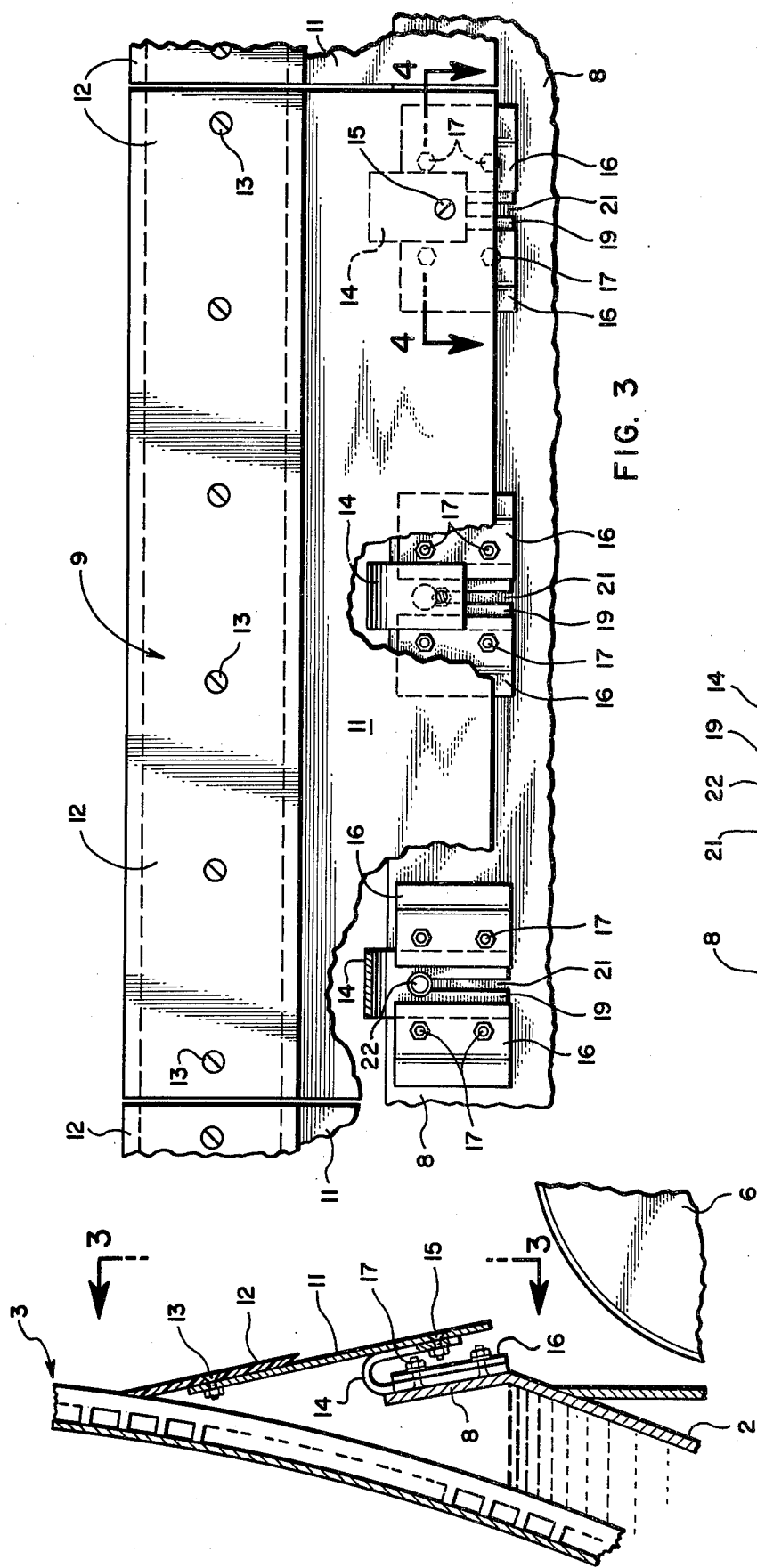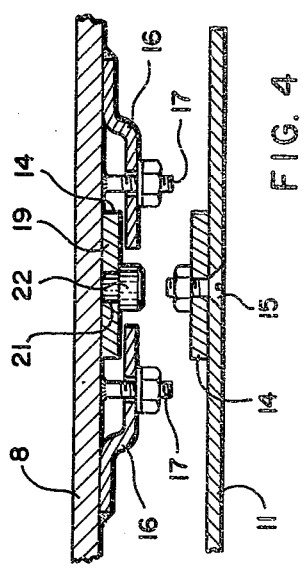

DEFLECTOR BLADE FOR ROTARY DRUM FILTER

FIELD AND BACKGROUND OF THE INVENTION

This invention relates to rotary drum vacuum filters and in particular to improved cake discharge deflector blades therefor.

Deflector blades guide filter cake released from the drum surface to a hopper or conveyor outside the drum. On large filters, it is usual to provide a segmented blade, each segment acting independently so that localized variations on the drum surface will be easily accommodated. Also, replacement of damaged sections can be readily accomplished without disturbing other segments.

Although segmented blades have proven very useful, they nevertheless are costly due to the fact that in accordance with prior designs each blade segment requires its own tensioning and spacing mechanism. Also, they are easily fouled with filter cake, frequently to a degree that interferes with cake discharge and requires manual correction.

SUMMARY OF THE INVENTION

It is the primary object of this invention to provide a segmented filter cake deflector blade that is simple of construction, low in initial cost, effective in operation and easy to replace and maintain in the field.

A further object is the provision of a segmented blade having its tension or resiliency preset and provided with means cooperative with complemental means on the filter for accepting the blade mount to automatically set the blade in operative position without further adjustment.

A related object is the provision of a segmented blade having a mount comprising relatively few elements that are spaced apart whereby accumulation of cake thereon is avoided.

The foregoing and other objects of the invention are achieved by a filter cake deflector blade made up from a plurality of individual or separate blade segments each of which comprises a straight edged blade connected to a plurality of identical and spaced apart U-shaped flat spring elements with the free edge of said blade extending an equal distance beyond the closed end of each of said U-shaped springs, a plurality of clamps on the filter tank arranged to accept and detachably secure the spring elements, and complemental means on said spring elements and said tank which cooperate to locate said blades in operative position with respect to the filter drum and adjacent blade segments upon insertion of the spring elements in said clamps.

The spring elements are of flat steel and are preformed in a U-shape. The springs are formed so that when the free end of the spring is received in the clamp the blade is positioned with its edge resting on the drum face. The blade and spring assemblies will be exact duplicates so that replacement is simple, consistent and low cost.

In order that the invention may be more readily understood and carried into effect, reference is made to the accompanying drawings and description thereof which are offered by way of illustration rather than in limitation of the invention, the scope of which is defined by the appended claims and equivalents thereof.

BRIEF DESCRIPTION OF THE DRAWINGS

FIG. 2 is a sectional view taken in the plane of line 2—2 of FIG. 1, looking in the direction of arrows 2;

FIG. 3 is a front elevation of a blade segment assembly taken as looking in the direction of arrows 3 of FIG. 2;

FIG. 4 is a partial section of FIG. 3 taken as looking in the direction of arrows 4 of FIG. 3.

DETAILED DESCRIPTION OF THE INVENTION

Figure 1:
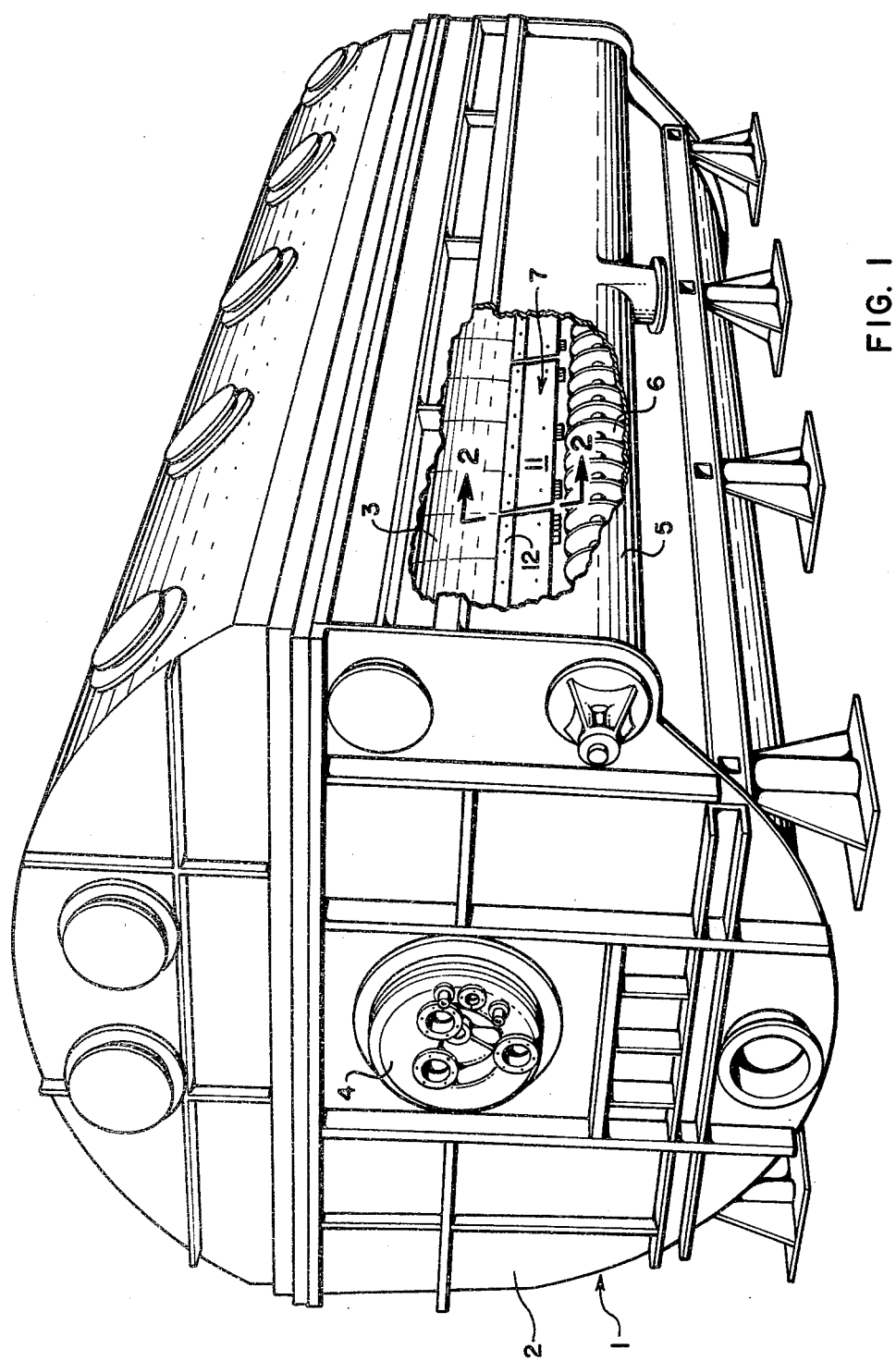
FIG. 1 is a perspective view of a rotary drum vacuum filter embodying the invention, the wall being partially cut away to better illustrate the deflector blade.

The illustrated embodiment is of a filter having a drum 1 mounted for rotation in a tank 2 by usual trunnions journalled in bearings on opposite end walls of the tank, one of the trunnions being associated with a valve 4 and the other with a drive.

In operation, successive portions of the drum submerge in slurry in the tank where vacuum draws filtrate through the filter medium while solids deposit as a cake on the surface. After emergence from the slurry, the cake may be washed and further dried by drawing air or other gas therethrough as the drum rotates toward the discharge position. Finally, vacuum is cut off to release the cake for discharge. Often a positive gas pressure is applied to the underside of the cake to assist discharge.

Discharged cake is deflected into a scroll conveyor 6 by a blade assembly, generally designed 7, mounted on the tank front wall 8 with the blade edge resting lightly on the drum surface.

The blade assembly comprises a plurality of independently mounted adjacent segments 9 located side by side across the tank face. Each segment is straight and includes a steel plate 11 to which may be fastened a replaceable edge 12, typically formed from virgin Teflon plastic and fastened by flat head bolts 13. The free edge is machined to a sharp edge and the beveled surface is positioned to ride lightly on the filter drum surface. The blade is a deflector as contrasted to a scraper. For this reason, it is set at a slight angle to the drum surface, desirably not in excess of about 15°, and as much closer to tangential as possible. This will minimize the danger of digging into the drum surface and insure that the cake passes easily thereover. Cake removal is further enhanced by locating the deflector blade below the drum centerline. The pressure of the free edge of the blade against the surface is relatively low. For instance, the U springs will be selected and the blade positioned so that a 42 inch blade will exert only 5–10 pounds total pressure on the drum.

As noted, positioning and pressure exerted by the blade is effected by the preselected U-shaped flat steel springs 14 in combination with the mounting brackets 16 on the tank wall and complemental elements on the blade and tank.

A typical blade segment is 42 inches long and is supported by three spaced-apart springs 14 secured to the straight blade by bolts 15 with the free edge of the blade extending beyond the closed end of the U. A typical spring may be about 2 inches wide. The clamps 16 are fixed on the tank wall and include two side pieces provided with suitable clamping bolts 17 and spaced apart to receive a free leg 19 of the spring with the clamps overlapping the edges thereof. Proper positioning of the blade laterally in the clamp as well as its location relative to the drum surface is accomplished by complemental means on the spring and tank which include open-ended slots 21 in the free ends 19 of the spring, the closed ends of which bottom on pins 22 extending from the tank wall between the clamps to position the blade assembly vertically.

As shown, a plurality of adjacent blade segments are mounted on the tank to form a deflector blade along the entire drum face. Since the segments operate independently, they can readily accommodate simultaneously several variations in conditions across the drum face. Also, since the springs are preset for location and tension, blade segments can be readily removed as necessary to periodically replace the blade edges 12. By spacing the springs apart, limiting them to relatively narrow strips and using a shallow blade angle, approaching tangential, accumulation of cake solids is avoided, as all cake falls outside the tank and inside the wall 5 of the scroll conveyor housing.

Although the blade positioning elements are shown as a bifurcated spring end and a pin on the tank wall, it is obvious that the elements can be reversed or other complemental means employed.

I claim:

1. A deflector blade assembly on a vacuum filter of the type having a drum journalled for rotation in a tank, said assembly including a plurality of adjacent seaprate blade segments positioned side-by-side on the wall of said tank in position to deflect cake released from said drum to a location outside said tank each segment comprising a straight blade secured to at least two spaced apart U-shaped flat springs with the free edge of said blade extending an equal distance beyond the closed end of each of said U-shaped springs, means detachably securing said blade to said tank including complemental elements on the free end of said U-shaped spring and on said tank cooperating with each other to position said springs and thus said straight blade relative to the surface of said drum and to said adjacent blade segments.

2. A deflector blade assembly according to preceding claim 1 in which said completemental elements on said springs and tank comprise a pin on either said tank or springs and a U-shaped slot on the other of said tank or springs adapted to receive said pin.

* * * * *